(12) United States Patent
Falvo et al.

(10) Patent No.: US 8,763,061 B2
(45) Date of Patent: Jun. 24, 2014

(54) CORRELATION OF TUNED CHANNEL INFORMATION WITH INTERNET WEB ADDRESSES

(75) Inventors: Barry P. Falvo, Norristown, PA (US); Christopher J. Stone, Newtown, PA (US)

(73) Assignee: Motorola Mobility LLC, Chicago, IL (US)

( * ) Notice: Subject to any disclaimer, the term of this patent is extended or adjusted under 35 U.S.C. 154(b) by 1033 days.

(21) Appl. No.: 10/075,888

(22) Filed: Feb. 13, 2002

(65) Prior Publication Data
US 2003/0154492 A1     Aug. 14, 2003

(51) Int. Cl.
  H04N 7/16     (2011.01)
  H04N 7/18     (2006.01)
  H04N 7/173    (2011.01)

(52) U.S. Cl.
  USPC ............. 725/112; 725/82; 725/110; 725/133; 725/153

(58) Field of Classification Search
  None
  See application file for complete search history.

(56) References Cited

U.S. PATENT DOCUMENTS

| | | | |
|---|---|---|---|
| 4,959,810 A | 9/1990 | Darbee et al. | |
| 5,282,028 A | 1/1994 | Johnson et al. | |
| 5,406,558 A | 4/1995 | Rovira et al. | |
| 5,907,322 A | 5/1999 | Kelly et al. | |
| 6,002,450 A | 12/1999 | Darbee et al. | |
| 6,018,768 A * | 1/2000 | Ullman et al. | 709/218 |
| 6,025,837 A | 2/2000 | Matthews, III et al. | |
| 6,130,726 A | 10/2000 | Darbee et al. | |
| 6,154,204 A | 11/2000 | Thompson et al. | |
| 6,326,982 B1 * | 12/2001 | Wu et al. | 715/718 |
| 6,349,410 B1 * | 2/2002 | Lortz | 725/110 |
| 6,367,080 B1 * | 4/2002 | Enomoto et al. | 725/112 |
| 6,816,201 B1 * | 11/2004 | Fang et al. | 348/468 |
| 6,862,611 B1 * | 3/2005 | Marics et al. | 709/218 |
| 2005/0028208 A1 * | 2/2005 | Ellis et al. | 725/58 |

FOREIGN PATENT DOCUMENTS

| | | |
|---|---|---|
| GB | 2343073 A | 4/2000 |
| WO | WO 9959334 A1 | 11/1999 |
| WO | WO 0147256 A1 | 6/2001 |
| WO | WO 0178054 A1 | 10/2001 |
| WO | WO 0191458 A1 | 11/2001 |

\* cited by examiner

Primary Examiner — Nasser Goodarzi
Assistant Examiner — Fred Peng

(57) ABSTRACT

An auxiliary display device, capable of remotely controlling a set-top box (STB) and/or television to select a program channel, is used to navigate a web browser in the auxiliary display device to a web site associated with the selected channel. A web page associated with the selected channel is presented on a display of the auxiliary display device. When the channel is selected, current tuned channel information is transmitted by the set-top box (STB) and/or television to the auxiliary display device, irrespective of whether the auxiliary display device was used to select the channel. In an alternate embodiment, the STB and/or television forward channel information to the auxiliary display device via a cable headend.

25 Claims, 8 Drawing Sheets

| Virtual Channel Number | Source ID | Carrier | Modulation Mode | Service Number | Descriptor |
|---|---|---|---|---|---|
| 100 | 1100 | 250 MHz | 64 QAM | 3 | NBC |
| 101 | 2306 | 250 MHz | 64 QAM | 5 | ESPN |
| 102 | 4002 | 300 MHz | 256 QAM | 1 | HBO |

FIG. 3

| Virtual Channel Number | Top level URL | Program Specific URL | Actor Profiles URL | Chat URL | Message Board URL | Game URL | Advertisement URL |
|---|---|---|---|---|---|---|---|
| 100 | www.nbc.com | www.nbc.com/ Weakest_Link/ | www.nbc.co m/Weakest_L ink/anne.html | 0 | | http://www.nb c.com/Weake st_Link/playal ong.html | |
| 101 | www.espn.com | espn.go.com/t hisissportscent er/index.html | 0 | dynamic.espn .go.com/espn /chat/chatES PN?event_id =799 | 0 | | promotions.go com/apps/esp n/attwireless/e ntry |
| 102 | www.hbo.com | www.hbo.com/ sopranos/ | http://www.hb o.com/sopran os/show/cast/ index.shtml | http://rw.hbo. com/cgi- bin/hbologon. cgi?.State=C hat&r=sopran os | rw.hbo.com/c gi- bin/hbologon. cgi?.State=B BS&r=sopran os&bbslocati on=.ee6b2bb | http://www.hb o.com/sopran os/community /trivia/sopran os_game.htm | http://www.hbo .com/NASApp/ hboxpress/jsp/ get_hbo.jsp |

FIG. 4

CORRELATION OF TUNED CHANNEL INFORMATION WITH INTERNET WEB ADDRESSES

BACKGROUND OF THE INVENTION

1. Field of the Invention

The present invention generally relates to the use and processing of interactive television data for delivering enhanced television programming in a CATV environment.

2. Background Information

The Advanced Television Enhancement Forum (ATVEF) was formed in 1997 by a consortium of 14 leading companies in the television and computing industries. This group developed a public, worldwide specification for creating and delivering interactive TV (ITV) content. In 1999, the ATVEF Specification v1.1, r26 was finalized and published. The ATVEF Specification serves as a standard for creating enhanced, interactive television content and delivering that content to a range of television, set-top, and PC-based receivers. The ATVEF Specification uses existing Internet technologies to deliver enhanced TV programming over both analog and digital video systems using terrestrial, cable, satellite and Internet networks. The ATVEF Specification can be used in both one-way broadcast and two-way video systems, and is designed to be compatible with all international standards for both analog and digital video systems.

Thus, with the advent of ATVEF and digital cable TV, a new era in TV viewing experience is emerging in which video complementary data services are available to the TV viewer. There are many potential methods for experiencing these data services. One such way is to use a second display screen on an auxiliary display device. One example of an auxiliary display device is a webpad, which is a relatively small remote wireless device.

FIG. 1 shows a conventional two-screen digital cable TV system 100. The system 100 includes an auxiliary display device 105 which communicates with a digital set-top box (STB) 110 (also referred to as a "local device") using a wireless connection. The wireless connection utilizes an external port 115 on the STB 110, such as a Universal serial bus (USB), Ethernet, or IEEE 1394 port equipped with an access point 120 that communicates with the auxiliary display device 105 over a wireless radio frequency (RF) link 125. The access point 120 in this scenario is a device designed for a specific interface (e.g., USB) and is used to support wireless connectivity. The auxiliary display device 105 may also be connected directly to a high-speed cable modem, digital subscriber (DSL) modem or any other high-speed Internet connection device to access the Internet 135. TV video programming 140 is accessible via STB 110. Typical wireless connection protocols that may be used by TV system 100 include, but are not limited to, HomeRF® and IEEE 802.11. A more traditional wired connection simply includes a cable or wire between the STB 110 and the auxiliary display device 105, again using a USB, Ethernet, or IEEE 1394 port. The STB 110 is also connected to a television 130.

The two-screen digital cable TV system 100 allows for many enhanced capabilities over a one-screen system. For example, a user can view Internet data on the screen of the auxiliary display device 105, while watching video uninterrupted on the television 130. In another example, STB applications that are normally viewed on the television screen, are viewed on the screen of the auxiliary display device 105, leaving the television 130 available for video program viewing.

In a CATV system, an electronic program guide (EPG) is a specific example of an application that can be interacted with through an application running on a second screen device, such as auxiliary display device 105. An EPG is used by a viewer to determine what programs are available for viewing on a television, at what time the programs will be broadcast, and on which channels, More sophisticated EPGs display supplemental information used by the viewer to determine whether the program is suitable for young children, what actors are in the program, how long the program is, and what the program is about. Normally in an EPG, an individual windowed portion is allocated for each program displayed. Viewers of CATV programs use a GUI to navigate an EPG and select program windows in the EPG that are of particular interest.

U.S. Pat. No. 6,130,726 (Darbee et al.) discloses a remote control display unit which selects programming shown on a television and stores program guide software in a memory. Upon actuation of one or more keys on the remote unit, a program guide, advertising and/or other supplemental content contained in a data set is displayed on a screen of the remote unit. A program guide or content scheduling guide stored in the remote unit may be updated on a periodic basis. Internet addresses may also be manually entered using an "EZ NAV key."

The remote control display unit disclosed in U.S. Pat. No. 6,130,726 displays information associated with a program channel tuned by the actuating keys on the remote unit. If a device other than the remote unit (e.g., an STB, a television) is used to change programming shown on a television, the supplemental content displayed on the remote unit will not be updated to correspond to the current channel. Thus, U.S. Pat. No. 6,130,726 does not disclose an auxiliary display device that changes supplemental content displayed by the auxiliary display device in response to receiving current channel information from a local device, such as an STB and/or television.

With an EPG or similar type of application running on a second display screen device, it is desirable to present Internet content associated with Internet server destinations associated with current programming channel selections, while at the same time tuning the channel. Such a feature provides a medium for companies to advertise their products and/or services on the second display screen device without having to pay the higher costs of directly broadcasting on a television channel that provides programming.

Currently, ATVEF requires that the content provider (e.g., "The Discovery Channel") supply "special" data within the signal of the programming channel that directs the user to a particular web site. For example, URL data may be encoded within the content of a television program. Thus, the auxiliary display device 105 receiving the content must be capable of extracting and decoding the URL data. This process is deficient because it does not account for providers who do not supply URL data. Furthermore, the process does not account for auxiliary display devices that are not compatible, and thus unable to receive, extract and/or decode the ATVEF data.

SUMMARY OF THE INVENTION

The present invention utilizes an auxiliary display device to present web content associated with selected programming displayed on a television without having to incorporate ATVEF data into the program content. Data associated with a currently tuned channel is received by the auxiliary display device and correlated in a database in the auxiliary display device with a URL associated with the tuned channel.

In a preferred embodiment of the present invention, a method is implemented in a communications system including a set-top box (STB) in communication with a television and an auxiliary display device. Program channels viewed on the television are changed and a web page associated with a current tuned channel viewed on the television is presented on a display of the auxiliary display device. The STB transmits current tuned channel information to the auxiliary display device. The auxiliary display device determines a particular uniform resource locator (URL) associated with the current tuned channel information. The auxiliary display device presents web content associated with the URL on the display of the auxiliary display device.

The auxiliary display device may present a hyperlink on the display. The hyperlink provides access to program channel data associated with a new tuned channel. Activating the hyperlink may change the current tuned channel to the new tuned channel. The program channel data may be correlated to a virtual channel map (VCM) residing in the STB. A web browser residing in the auxiliary display device may use the URL to access a web site that provides the web content to be presented on the display of the auxiliary display device. The STB may transmit the current tuned channel information to the auxiliary display device when a user changes the current tuned channel, or in response to a user playing back a previously recorded program viewed on the television. The recorded program may include program channel data. The communications system may be a cable television (CATV) system.

In one embodiment of the present invention, a method is implemented in a communications system including an STB in communication with a remote server, a television and an auxiliary display device. A VCM is received at the STB from the remote server. The VCM includes uniform resource locator (URL) information associated with at least one program channel. The STB transmits the VCM to the auxiliary display device. The VCM is stored in the auxiliary display device. The STB transmits current tuned channel information to the auxiliary display device. The auxiliary display device correlates the current tuned channel information to a particular URL contained in the VCM. The auxiliary display device presents web content associated with the particular URL on the display.

In an alternate embodiment, the present invention is a communications system that includes a remote server, an STB and an auxiliary display device. The STB includes a VCM. The auxiliary display device includes a display that presents a web page associated with a current tuned channel viewed on a television. The STB transmits current tuned channel information to the auxiliary display device via the remote server.

The communications system may also include a cable modem and a wireless communication bridge. The STB may transmit current tuned channel information to the auxiliary display device via the remote server, the cable modem and the wireless communication bridge. The remote server may be a cable head-end operated by a multiple system cable operator (MSO). The cable head-end may include reverse data channel (RDC) equipment, a network control system (NCS), and a cable modem termination system (CMTS).

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings:

FIG. 3 shows an exemplary virtual channel map used to tune channels in accordance with the present invention;

FIG. 4 shows an exemplary virtual channel map used to obtain web content associated with selected channels in accordance with a preferred embodiment of the present invention;

DETAILED DESCRIPTION OF THE INVENTION

The present invention is a method and communications system for changing program channels viewed on a television and presenting, on a display of an auxiliary display device, a web page associated with a current tuned channel viewed on the television. The present invention can be utilized to navigate a web browser in the auxiliary display device to a particular web site based on the channel that the viewer has tuned his STB and/or television to. The present invention may be implemented by Internet appliances, cable/satellite television access control protocols, or any auxiliary display devices equipped with a web browser.

Figure 1:
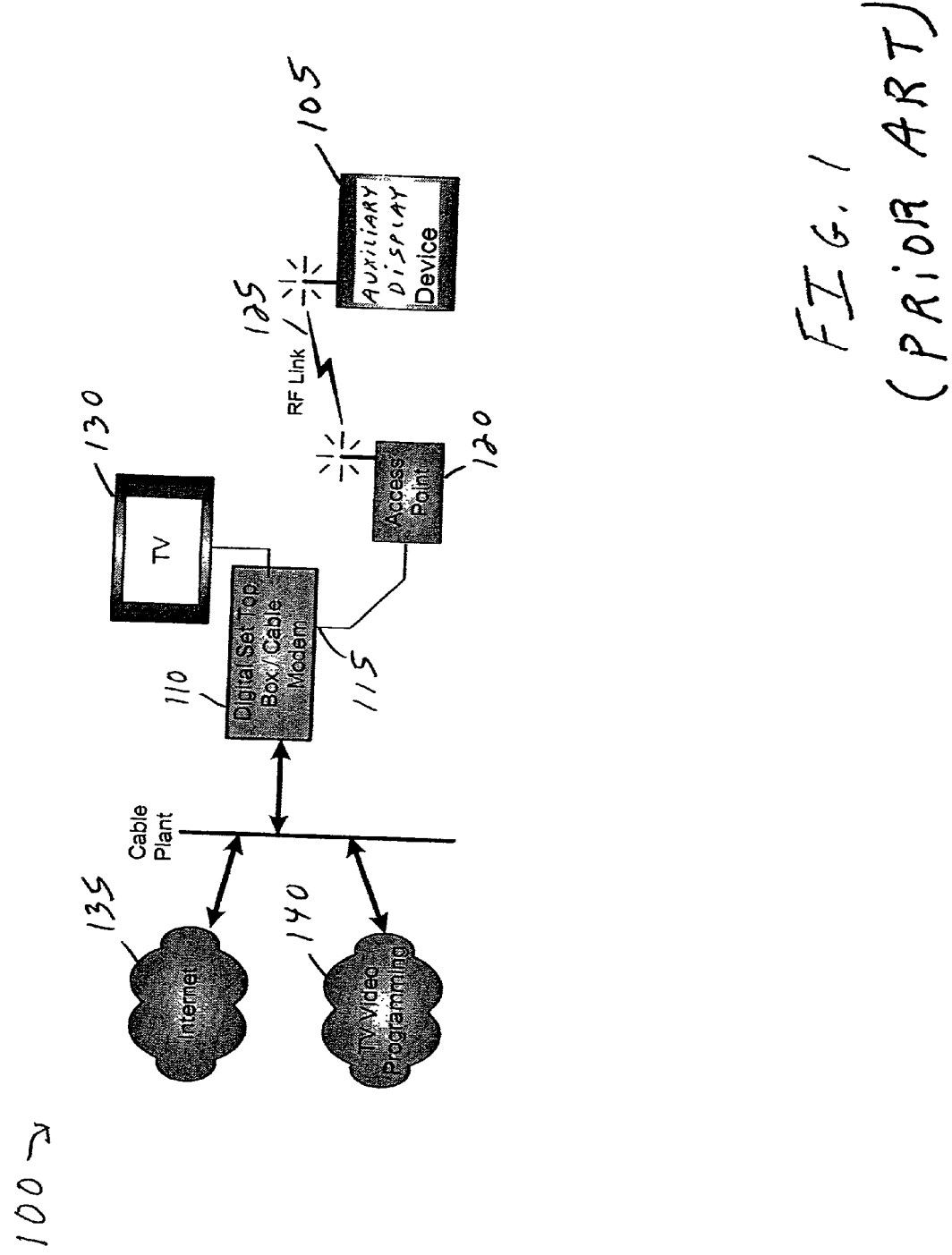
FIG. 1 shows a conventional two-screen digital cable TV system.
Figure 2:
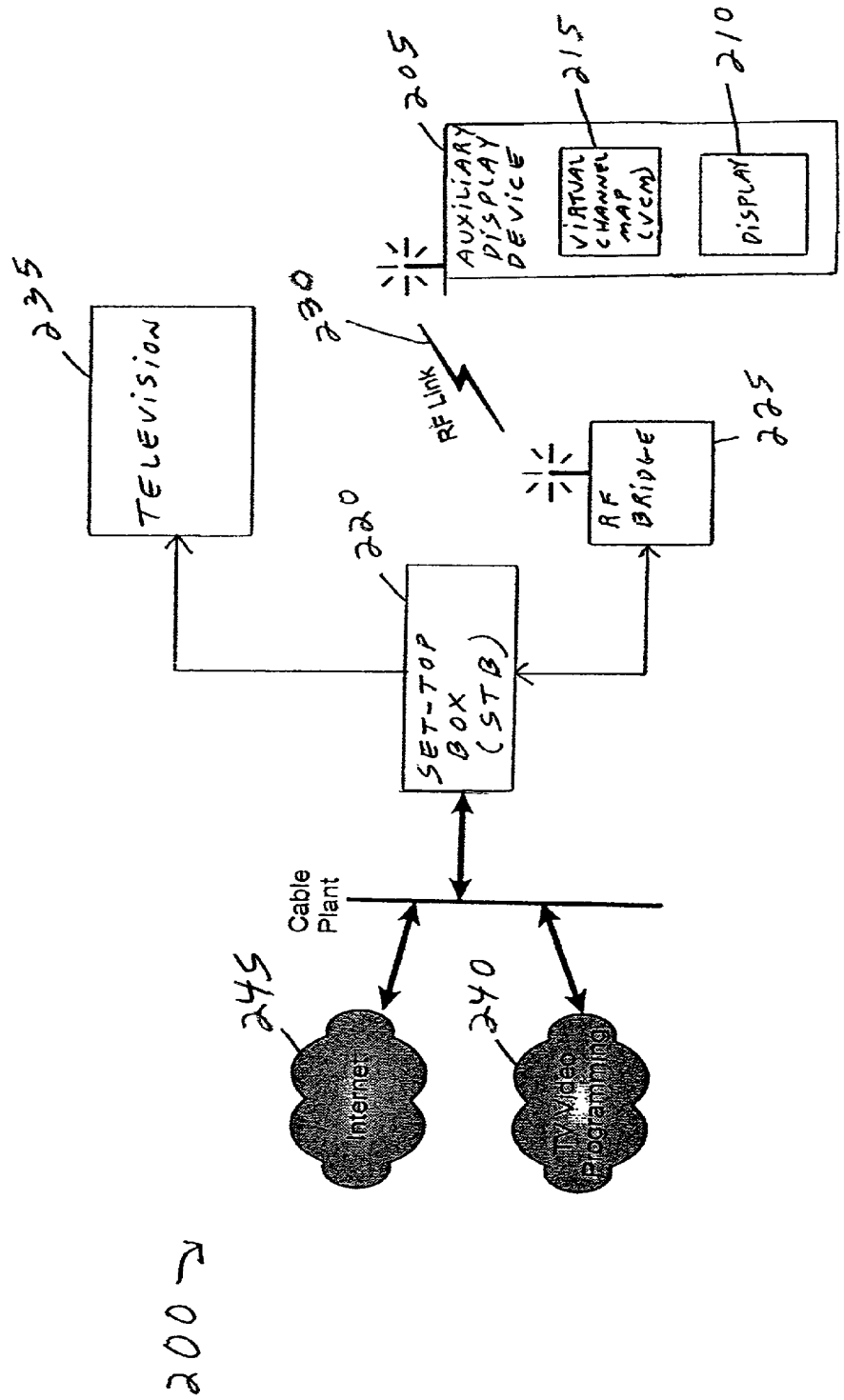
FIG. 2 shows a communications system in accordance with a preferred embodiment of the present invention.

FIG. 2 shows a communications system 200 configured in accordance with a preferred embodiment of the present invention. The system 200 includes an auxiliary display device 205 which communicates with an STB 220 via an RF bridge 225 over a wireless (RF) link 230. The auxiliary display device 205 includes a display 210 and a virtual channel map (VCM), both controlled by an application running on a processor (not shown) residing within the auxiliary display device 205. The STB 220 is connected to a television 235. The auxiliary display device 205 is used to wirelessly change tuned channels on STB 220 and/or television 235 to select programming shown on television 235. Tuned channels may be manually selected by a user depressing channel control buttons (not shown) located on STB 220 and/or television 235. Television video programming 240 and Internet 245 are accessible via STB 220.

Typical wireless connection protocols that may be used by TV system 200 include, but are not limited to, HomeRF and IEEE 802.11. The wireless connection may be in the form of a wireless LAN (e.g., an 802.11 WLAN, a HomeRF WLAN, a dedicated proprietary RF WLAN or other WLAN protocol type), infrared (IR), or any other type of wireless RF/WLAN technology.

A more traditional wired connection simply includes a cable or wire between the STB 220 and the auxiliary display device 205 using modulated RF over cable, USB, RJ-45 (Ethernet), IEEE-1394 (FireWire®, i.Link®), RS-232 or any other serial type connection.

TV program channel control can be initiated by selection of an HTML hyperlink presented on display 210 of auxiliary display device 205 that is interpreted as a channel change. A browser in auxiliary display device 205 has a function key that enables a "smart mode" which interprets a hyperlink selection as a channel change request. Information contained in the HTML page (e.g., the channel number appears somewhere in the same line) is sufficient to allow the browser to kick-off a parallel action that communicates the information to the STB 220, which, in turn, resolves it through a VCM in the STB 220 and changes the channel as if the channel number was entered through the remote control. Web-based program guides can be created to contain the information necessary for the smart application to work. Web pages presented on display 210 of auxiliary display device 205 may include hyperlinks that, when selected, change the current tuned channel to a new channel.

FIG. 3 shows an example of a generic VCM used to tune channels. In order for auxiliary display device 205 to associate tuned channels with associated web content, it must have knowledge of specific information contained in a VCM stored at the STB 220 and/or auxiliary display device 205. Specifically, at a minimum it needs to have a listing of all virtual channel numbers and Source IDs. A virtual channel number is simply a representation of a physical tuned channel. A Source ID is a unique identifier for each "channel."

FIG. 4 shows an example of a generic VCM used to obtain web content associated with tuned channels. In its simplest form, a top level Unified Reference Locator (URL) is used. As shown in FIG. 4, virtual channel number "100" is associated with www.nbc.com, virtual channel number "101" is associated with www.espn.com, and virtual channel number "102" is associated with www.hbo.com. When a channel number is selected, the content of the associated top level URL is displayed on display 210 of auxiliary display device 205. An alternative approach is to associate the channel with the page of the specific program that is playing at the time, for example, www.nbc.com/Weakest Link/. Yet another approach is to provide access to an even more specific URL, for example, www.nbc.com/Weakest Link/playalong.html. Thus, the channel can be associated with a top level URL, a program specific URL, an activity (e.g., play a game, look up information), or a "re-directing URL" that re-directs a query to a program specific URL associated with a presently broadcast program. Additional alternatives include URLs for actor profiles, chat, message boards, games, advertisements, polls, supplemental audio and video, statistics, or the like.

Since these fields can potentially change dynamically such that program specific URLs are maintained, the association between the URLs and the virtual channel number can be implemented at the cable headend such that the VCM gets modified accordingly before it is sent to the STB 220. The VCM can then be delivered to the STB 220 directly and then delivered to the auxiliary display device 205 either directly over a modem connection (see cable modem 720 in FIG. 7), or indirectly, through the STB 220. The association can be implemented in either the STB 220 or the auxiliary display device 205. The auxiliary display device 205 is capable of accessing a VCM located in the STB 220 and then querying a remote server with the virtual channel number or source ID for the associated program URL. Another approach is to have just one URL association (the top level URL) and then have a web server redirect the browser in the auxiliary display device 205 to a web page associated with the program being currently broadcast.

Figure 5:
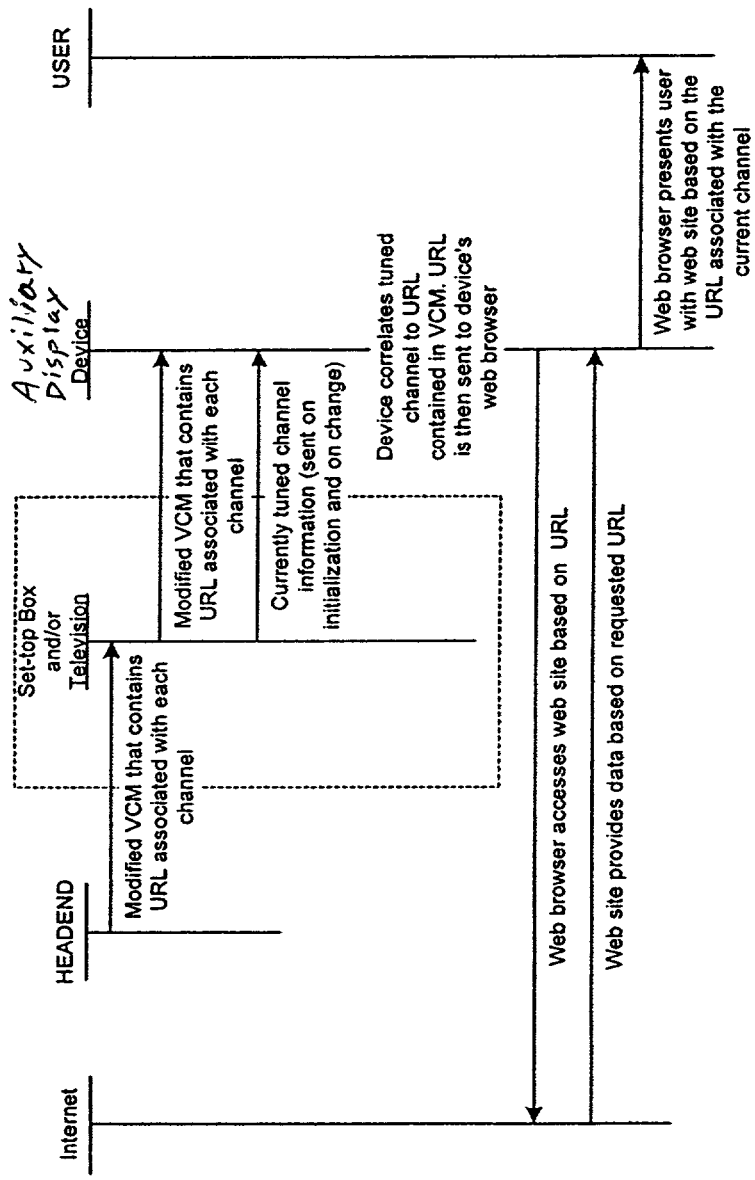
FIG. 5 shows a data flow diagram for the communications system of FIG. 2.
Figure 6:
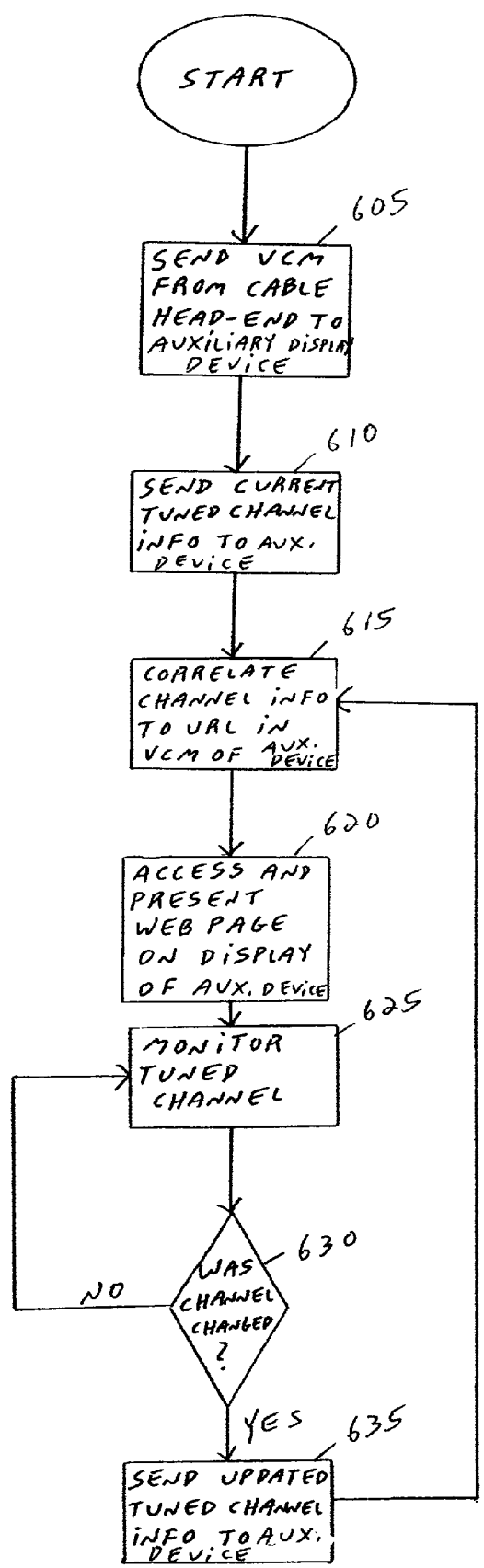
FIG. 6 is a high-level functional flowchart including steps implemented by the communications system of FIG. 2.

FIGS. 2, 5 and 6 show how the preferred embodiment of the present invention is implemented. In step 605, a VCM is sent from a cable head-end controlled by a Multiple Service Operator (MSO) to auxiliary display device 205 via STB 220 and/or television 235, and stored in a memory (not shown) residing within auxiliary display device 205. STB 220 may be incorporated into television 235. The VCM may be updated by the cable head-end on a periodic basis (e.g., once every 24 hours). In step 610, current tuned channel information is sent from STB 220 and/or television 235 to auxiliary display device 205. Alternatively, current tuned channel information may be sent in response to a personal video recorder (PVR) (not shown) stripping out live ATVEF content including the channel information from a previously recorded video that is being played back. The personal video recorder (PVR) can be incorporated into STB 220 or it can be configured as an independent device that communicates with STB 220 and/or television 235. Current tuned channel information received by auxiliary display device 205 is correlated to a URL in the VCM stored in auxiliary display device 205 (step 615). Thus, the auxiliary display device 205 is configured to contain a database, which may be downloaded/updated via the Internet, that correlates channels with URLs and relies on the STB 220 and/or television 235 to inform the auxiliary display device 205 of the currently tuned channel.

As a user selects different channels using the STB 220 and/or television 235, the auxiliary display device 205 is supplied with information associated with the currently tuned channel (i.e., channel number). The auxiliary display device 205 receives the currently tuned channel information. In step 620, a web browser in auxiliary display device 205 accesses a web site based on the correlated URL and the web site provides data based on the URL to the auxiliary display device 205. As a result, a web page associated with the URL is displayed on display 210 of auxiliary display device 205 while the program content associated with the current tuned channel is shown on television 235. The current tuned channel is constantly monitored (step 625). When the current channel is changed (step 630), updated tuned channel information is sent to auxiliary display device 205 from STB 220 and/or television 235 (step 635).

Figure 7:
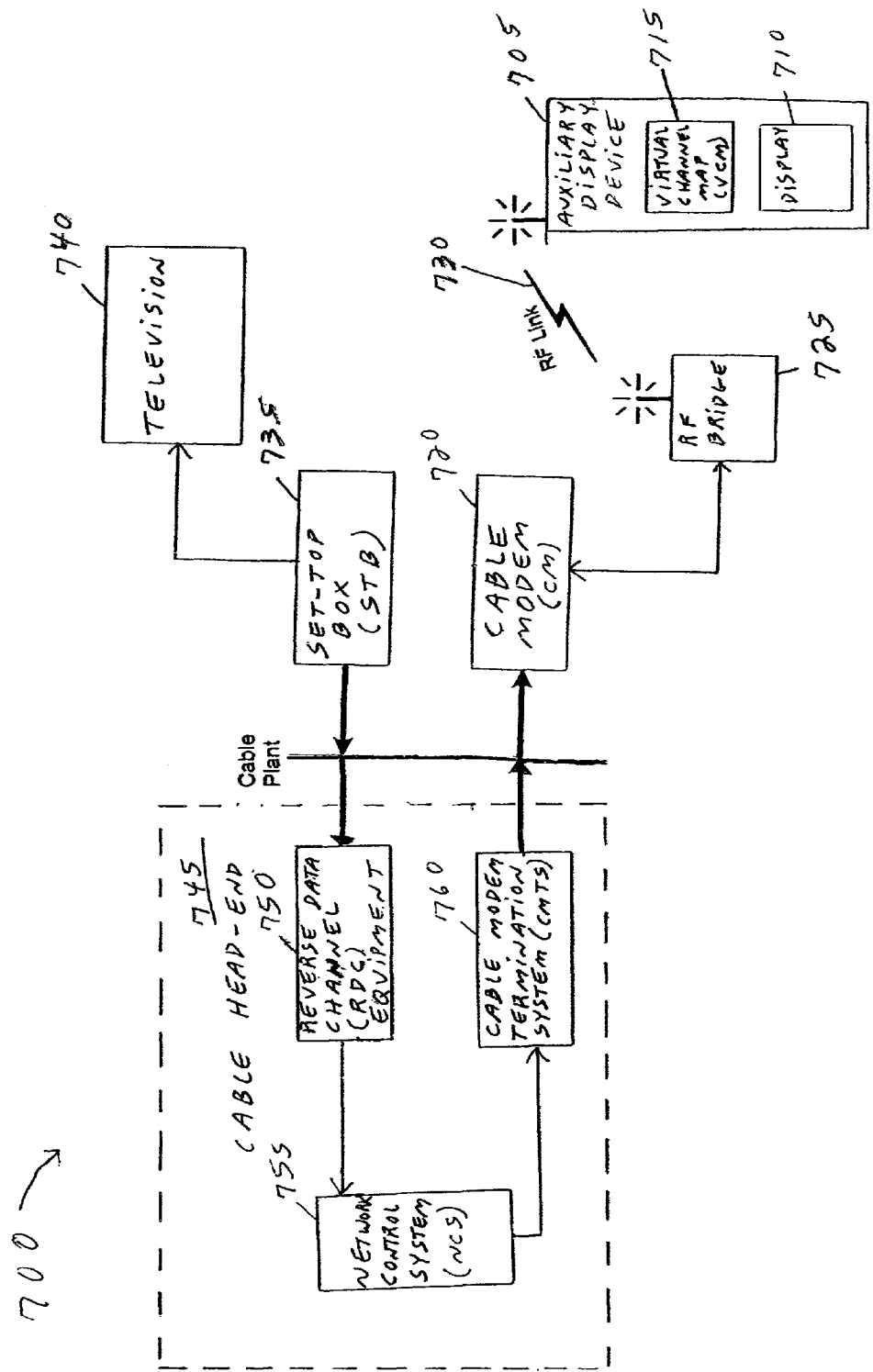
FIG. 7 shows a communications system used in accordance with an alternate embodiment of the present invention.
Figure 8:
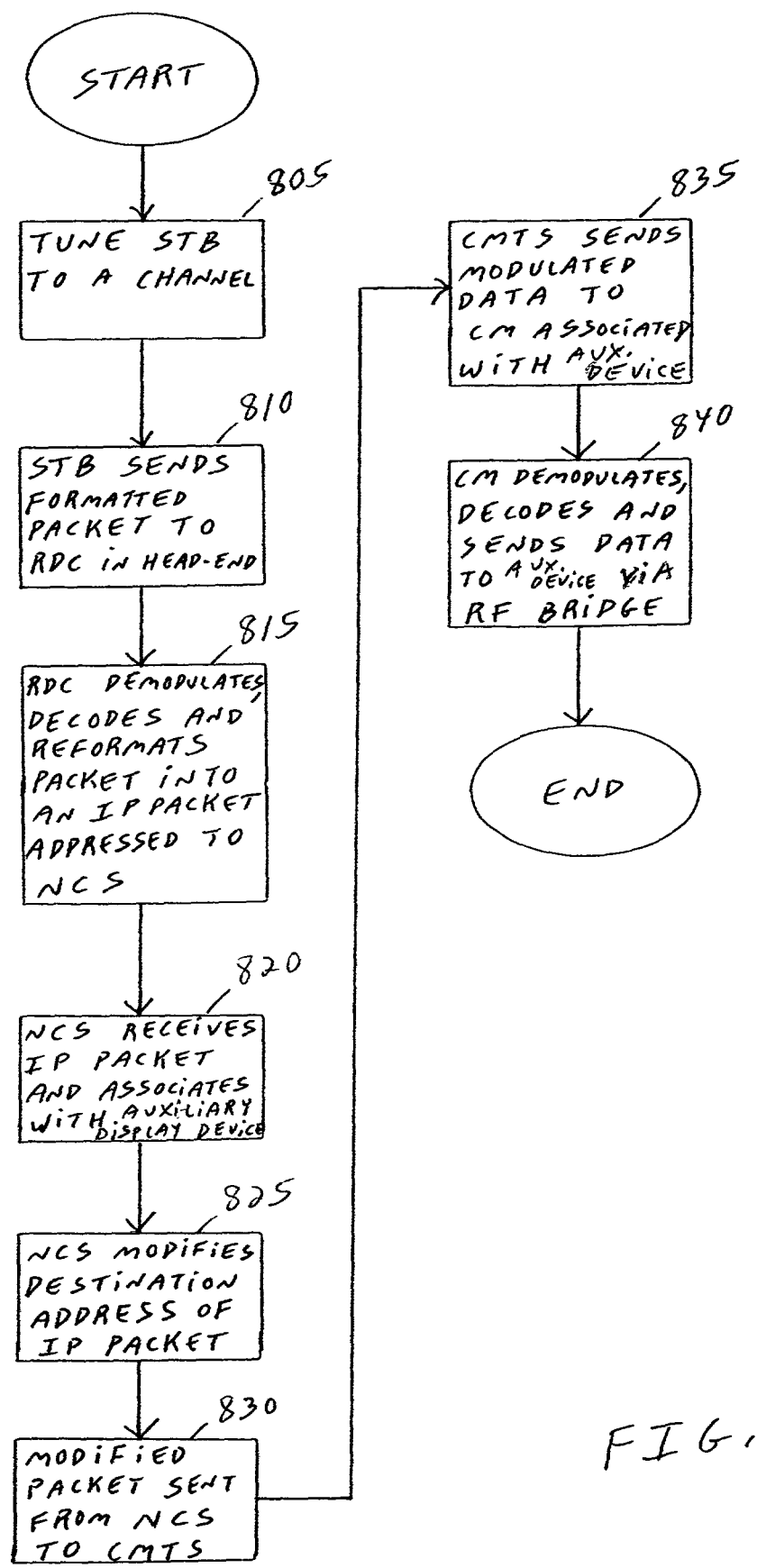
FIG. 8 is a high-level functional flowchart including steps implemented by the communications system of FIG. 7.

FIGS. 7 and 8 show how an alternate embodiment of the present invention is implemented in a communications system 700. System 700 includes an auxiliary display device 705 which includes a display 710 and a VCM 715. The auxiliary display device 705 communicates with a cable modem (CM) 720 via RF bridge 725 and RF link 730. System 700 also includes an STB 735 which communicates with television 740. The STB 735 and CM 720 are each independently connected to cable head-end 745, which includes reverse data channel (RDC) equipment 750, network control system (NCS) 755 and cable modem termination system (CMTS) 760. In system 700, STB 735 has no direct way to communicate with CM 720 and auxiliary display device 705. Thus, the STB 735 must have the cable head-end 745 act as a communications bridge. When a tuned channel for STB 735 and/or television 740 is selected (step 805), a formatted packet compatible with the cable plant is generated by the STB 735 and/or television 740. The formatted packet is transmitted to cable head-end 745 and is received by RDC equipment 750 (step 810). The RDC equipment 750 demodulates, decodes and reformats data in the received packet into an Internet Protocol (IP) packet addressed to the NCS 755 (step 815). The NCS 755 receives the packet from the RDC equipment 750 and associates the IP address of the auxiliary display device 705 with the packet received from STB 735 and/or television 740 (step 820). The NCS 755 modifies the destination of the IP address by reformatting the IP packet (step 825) and sends the reformatted IP packet to CMTS 760 (step 830). CMTS 760 modulates data in the reformatted IP packet and sends the modulated data to CM 720, which is associated with the IP address of auxiliary display device 705 (step 835). The CM 720 demodulates, decodes and sends the data to auxiliary display device 705 via RF bridge 725 and RF link 730 (step 840).

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. In a communications system including a set-top box (STB) in communication with a television and an auxiliary display device, a method of changing program channels viewed on the television and presenting, on a display of the auxiliary display device, a web page associated with a current tuned channel number viewed on the television, the method comprising:
   (a) the STB transmitting the current tuned channel number to the auxiliary display device;
   (b) the auxiliary display device determining a particular uniform resource locator (URL) associated with the current tuned channel number utilizing the current tuned channel number provided by the STB by using a VCM when changing program channels viewed on the television, wherein the VCM includes uniform resource locator (URL) information associated with at least one program channel; and
   (c) the auxiliary display device presenting web content associated with the URL associated with the current tuned channel number on the display of the auxiliary display device.

2. The method of claim 1, further comprising:
   (d) the auxiliary display device presenting a hyperlink on the display, the hyperlink providing access to program channel data associated with a new tuned channel; and
   (e) activating the hyperlink to change the current tuned channel to the new tuned channel.

3. The method of claim 2, further comprising:
   (f) correlating the program channel data to a virtual channel map (VCM) stored in the STB.

4. The method of claim 1 wherein step (c) further comprises a web browser residing in the auxiliary display device using the URL to access a web site, the web site providing the web content to be presented on the display of the auxiliary display device.

5. The method of claim 1 wherein step (a) is implemented in response to a user changing the current tuned channel.

6. The method of claim 1 wherein step (a) is implemented in response to a user playing back a previously recorded program viewed on the television, the recorded program including program channel data.

7. In a communications system including a set-top box (STB) in communication with a remote server, a television and an auxiliary display device, a method of changing program channels viewed on the television and presenting, on a display of the auxiliary display device, a web page associated with a current tuned channel number viewed on the television, the method comprising:
   (a) receiving, at the STB, a virtual channel map (VCM) from the remote server, the VCM including uniform resource locator (URL) information associated with at least one program channel;
   (b) the STB transmitting the VCM to the auxiliary display device;
   (c) storing the VCM in the auxiliary display device;
   (d) the STB transmitting current tuned channel number to the auxiliary display device;
   (e) the auxiliary display device correlating the current tuned channel number to a particular URL contained in the VCM utilizing the current tuned channel number provided by the STB when changing program channels viewed on the television; and
   (f) the auxiliary display device presenting web content associated with the particular URL associated with the current tuned channel number on the display of the auxiliary display device.

8. The method of claim 7, further comprising:
   (g) the auxiliary display device presenting a hyperlink on the display of the auxiliary display device, the hyperlink providing access to program channel data associated with a new tuned channel; and
   (h) activating the hyperlink to change the current tuned channel to the new tuned channel.

9. The method of claim 8 wherein the program channel data is correlated to a VCM stored in the STB, and the STB changes the current tuned channel to the new tuned channel.

10. The method of claim 7 wherein step (e) further comprises a web browser residing in the auxiliary display device using the particular URL to access a web site, the web site providing the web content to be presented on the display of the auxiliary display device.

11. The method of claim 7 wherein step (d) is implemented in response to a user changing the current tuned channel.

12. The method of claim 7 wherein step (d) is implemented in response to a user playing back a previously recorded program viewed on the television, the recorded program including program channel data.

13. The method of claim 7 wherein the STB transmits the current channel number to the auxiliary display device via the remote server.

14. A communications system for changing program channels viewed on a television and presenting a web page associated with a current tuned channel, the system comprising:
   (a) a set-top box (STB) in communication with the television; and
   (b) an auxiliary display device which includes a display that presents a web page associated with a current tuned channel number viewed on the television, wherein:
       (i) the STB transmits current tuned channel number to the auxiliary display device;
       (ii) the auxiliary display device determines a particular uniform resource locator (URL) associated with the current tuned channel number utilizing the current tuned channel number provided by the STB, by using a VCM when changing program channels viewed on the television, wherein the VCM includes uniform resource locator (URL) information associated with at least one program channel; and (iii) the auxiliary display device presents web content associated with the particular URL associated with the current tuned channel number on the display of the auxiliary display device.

15. The system of claim 14, further comprising: (c) a wireless communication bridge, wherein the STB transmits the current tuned channel number to the auxiliary display device via the wireless communication bridge.

16. The system of claim 14 wherein the auxiliary display device presents a hyperlink on the display of the auxiliary display device, the hyperlink providing access to program channel data associated with a new tuned channel when activated.

17. The system of claim 14 wherein the STB includes a virtual channel map (VCM), and the program channel data is correlated to the VCM.

18. The system of claim 14 wherein the auxiliary display device further comprises a web browser used to access a web site based on the particular URL, the web site providing data to be presented on the display of the auxiliary display device.

19. The system of claim 14 wherein the STB transmits current tuned channel number to the auxiliary display device in response to a user changing the current tuned channel.

20. The system of claim 14 wherein the communications system is a cable television (CATV) system.

21. A communications system for changing program channels viewed on a television and presenting a web page associated with a current tuned channel number, the system comprising:
   (a) a remote server;
   (b) a set-top box (STB) in communication with the remote server and the television, the STB including a virtual channel map (VCM), including uniform resource locator (URL) information associated with at least one program channel; and
   (c) an auxiliary display device which includes a display that presents a web page associated with the current tuned channel number viewed on the television, wherein the STB transmits the current tuned channel number to the auxiliary display device via the remote server and the auxiliary device determines the web page to be displayed utilizing the current tuned channel number provided by the STB when changing program channels viewed on the television.

22. The system of claim 21, further comprising:
   (d) a cable modem in communication with the remote server; and
   (e) a wireless communication bridge, wherein the STB transmits the current tuned channel number to the auxiliary display device via the remote server, the cable modem and the wireless communication bridge.

23. The system of claim 21 wherein the STB transmits the current tuned channel number to the auxiliary display device in response to a user changing the current program channel.

24. The system of claim 21 wherein the remote server is a cable head-end operated by a multiple system cable operator (MSO), the cable head-end comprising:
   (i) reverse data channel (RDC) equipment;
   (ii) a network control system (NCS); and
   (iii) a cable modem termination system (CMTS).

25. The system of claim 21 wherein the communications system is a cable television (CATV) system.

* * * * *